United States Patent
Chen et al.

(10) Patent No.: US 11,194,303 B2
(45) Date of Patent: Dec. 7, 2021

(54) METHOD AND SYSTEM FOR ANOMALY DETECTION AND NOTIFICATION THROUGH PROFILED CONTEXT

(71) Applicant: International Business Machines Corporation, Armonk, NY (US)

(72) Inventors: Jim C. Chen, Rochester, MN (US); John M. Santosuosso, Rochester, MN (US); Jason A. Nikolai, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 473 days.

(21) Appl. No.: 16/207,389

(22) Filed: Dec. 3, 2018

(65) Prior Publication Data

US 2020/0174869 A1 Jun. 4, 2020

(51) Int. Cl.
*G05B 19/042* (2006.01)
*G06F 11/07* (2006.01)
*G06N 5/02* (2006.01)

(52) U.S. Cl.
CPC ........ *G05B 19/042* (2013.01); *G06F 11/0736* (2013.01); *G06N 5/02* (2013.01); *G05B 2219/26* (2013.01); *G05B 2219/2642* (2013.01); *G06F 11/079* (2013.01); *G06F 11/0751* (2013.01); *G06F 11/0769* (2013.01)

(58) Field of Classification Search
None
See application file for complete search history.

(56) References Cited

U.S. PATENT DOCUMENTS

| 9,712,549 | B2 | 7/2017 | Almurayh |
| 9,872,088 | B2 | 1/2018 | Fadell et al. |
| 9,965,685 | B2 | 5/2018 | Matsuoka et al. |
| 2016/0314782 | A1 | 10/2016 | Klimanis |

FOREIGN PATENT DOCUMENTS

WO WO2018036281 A1 3/2018

OTHER PUBLICATIONS

Lu et al., "Hybrid User-Assisted Incremental Model Adaptation for Activity Recognition in a Dynamic Smart-Home Environment", 2013, IEEE Transactions on Human-Machine Systems, vol. 43, No. 5, pp. 421-436.

Lu et al., "Method of Anomaly Detection and Notification in SmartHome Environment Through Profiled Context", Sep. 2013, IEEE Transactions on Human-Machine Systems, vol. 43, No. 5, pp. 421-436.

*Primary Examiner* — Mohammad Ali
*Assistant Examiner* — Saad M Kabir
(74) *Attorney, Agent, or Firm* — Donald J. O'Brien

(57) ABSTRACT

A method, system and computer program product are provided for implementing anomaly detection and notification through profiled context. Anomalies are detected by effectively using multiple devices and using predefined profiles to generate a contextual comparison for subtle differences detected. When predefined subtle anomalies are detected using at least one of the predefined profiles, a selected notification is provided.

20 Claims, 5 Drawing Sheets

METHOD AND SYSTEM FOR ANOMALY DETECTION AND NOTIFICATION THROUGH PROFILED CONTEXT

FIELD OF THE INVENTION

The present invention relates generally to the data processing field, and more particularly, relates to a method, system and computer program product for implementing enhanced anomaly detection and notification in a smart home environment through profiled context.

DESCRIPTION OF THE RELATED ART

Smart devices for the home have been a rapidly growing industry. Smart devices such as Nest, Google Home, and Alexa have added convenience features and capabilities to the home and daily life. This technology also opens the opportunity to improve the safety within this environment. Currently, technology exists that wakes up and monitors for major disturbances, such as motion, loud noises, key words, and the like. For example, existing simple motion detectors, digital assistants, or recording devices that can wake up to those types of triggers.

SUMMARY OF THE INVENTION

Principal aspects of the present invention are to provide a method, system and computer program product for implementing anomaly detection and notification in a smart home environment through profiled context. Other important aspects of the present invention are to provide such method, system and computer program product substantially without negative effects and that overcome many of the disadvantages of prior art arrangements.

In brief, a method, system and computer program product are provided for implementing anomaly detection and notification in a smart home environment through profiled context. Anomalies are detected within a smart home by effectively using multiple smart devices in the smart home environment and using predefined profiles to generate a contextual comparison for subtle differences detected. When predefined subtle anomalies are detected using at least one of the predefined profiles, a selected notification is provided.

In accordance with features of the invention, using predefined profiles to generate a contextual comparison for subtle differences detected includes first determining if analysis is triggered. When analysis is triggered, changes are analyzed within context against the profiles. A notification or enforcement is provided if needed. Historical information is learned, updated and re-baselining is performed.

In accordance with features of the invention, multiple notification options are enabled. For the smart home environment, profiles are created for several entities and multiple attributes are established and stored in a profile database. For example, a home profile, a family profile, individual profiles, room profiles, and scenario profiles are created and stored in the profile database. Scenario based profiles are provided where under certain circumstances the triggers and rules may change.

In accordance with features of the invention, a context analysis entity includes a profile and knowledge base manager, an audio and visual monitoring engine, and a real time event analysis engine.

In accordance with features of the invention, when operation begins a continuous processing loop is started including gathering data feeds, identifying differences and changes in input feeds to trigger analysis, comparing identified differences and changes in the feed against the profiles with context, providing enforcement and trigger notification if needed, and learning and re-baselining historical information.

In accordance with features of the invention, an analysis engine wakes up when a difference in a sequence of visual frames is detected. The changes in the frames are examined and the objects within the changed frames are identified. The analysis engine can also wake up if a sound anomaly is introduced into the environment. Over time, a baseline aggregate of visual and audio patterns of each room monitored is established to serve for threshold comparison purposes. The differences detected are then compared within context to an applicable profile or profiles in the system. When a relationship is found in violation between the identified difference and profiles for an entity, then enforcement and notification is triggered.

In accordance with features of the invention, anomaly examples include a user indicated object on a coffee table, individuals entering the house that cannot be identified, detection of a foreign language different than the language identified in the house profile, a sound identified as a window breaking, and the like.

In accordance with features of the invention, several options can be taken when anomaly thresholds are identified, such as alerting the head of the family or designated authority by default to dial 911. A scoring notification system can include where each anomaly is rated, and authorities are only alerted for the most severe violation. The notifications for a secondary or tertiary rated anomaly would go elsewhere. The scoring system enables reports to be generated at a set time frame, such as a day or week, and provided to an authorized user.

In accordance with features of the invention, the context information used to trigger the action by the central software entity can be made available with notifications, enabling better informed decisions for response.

In accordance with features of the invention, confirmation of scenario types includes confirmation of foreign language detected enabling selection of an officer that can speak that language to enter the house, confirmation of children present in the scenario and individual specific scenarios that may benefit in selecting an officer that enters the house.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention.

The terminology used herein is for the purpose of describing embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing enhanced anomaly detection and notification in smart home environment through profiled context.

Figure 1:
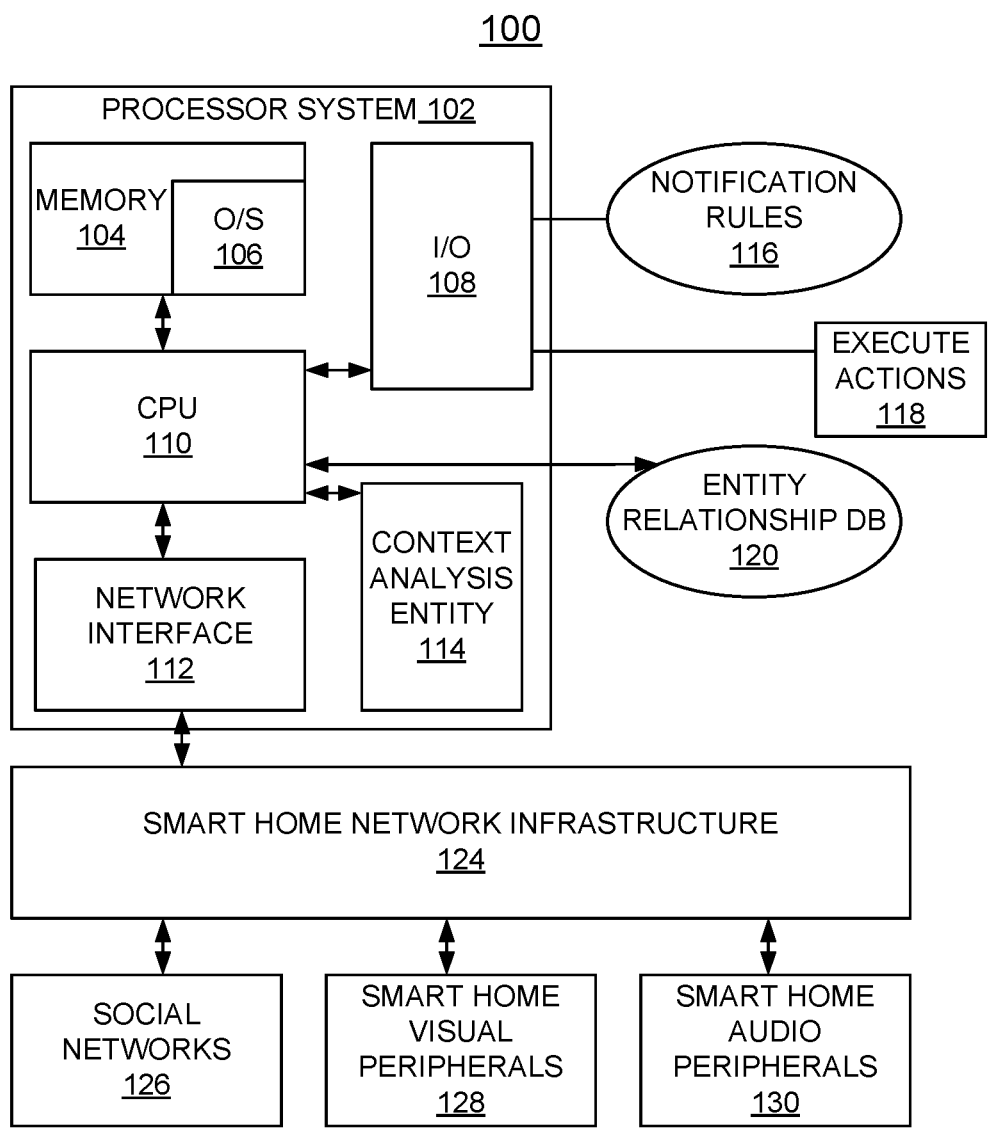
FIGS. 1 and 2 together provide a block diagram of an example computer system for implementing enhanced anomaly detection and notification in a smart home environment through profiled context in accordance with preferred embodiments.
Figure 2:
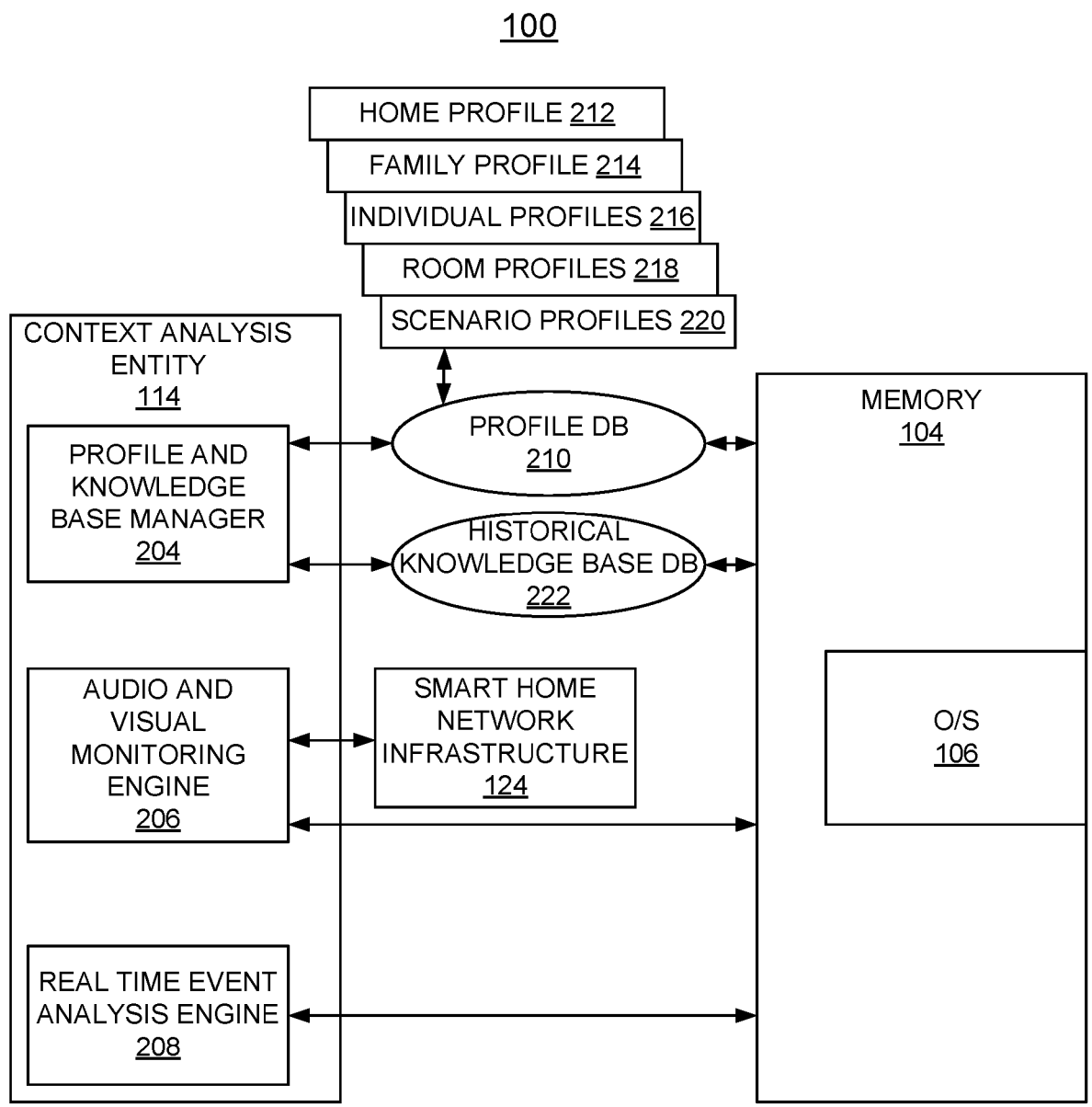

Having reference now to the drawings, in FIGS. 1 and 2, there is shown an example system embodying the present invention generally designated by the reference character 100 for implementing enhanced anomaly detection and notification in smart home environment through profiled context in accordance with preferred embodiments.

System 100 includes a processor or computer system 102 in accordance with preferred embodiments. Processor system 102 includes a memory 104 including an operating system 106, and an I/O interface 108 for transferring data to and from I/O system components. Processor system 102 includes one or more processors 110 or general-purpose programmable central processing units (CPUs) 110. As shown, processor system 100 includes a single CPU 110; however, system 100 can include multiple processors 104. Processor system 102 includes a network interface 112 and a context analysis entity 114 coupled to the CPU 110 in accordance with preferred embodiments.

System memory 104 is a random-access semiconductor memory for storing data, including programs. System memory 106 is comprised of, for example, a dynamic random-access memory (DRAM), a synchronous direct random-access memory (SDRAM), a current double data rate (DDRx) SDRAM, non-volatile memory, optical storage, and other storage devices.

Processor system 102 includes the I/O interface 108 for transferring data to and from notification rules 116 and execute actions 118 in accordance with preferred embodiments. An entity relationship database (DB) 120 is coupled to the CPU 110 in accordance with preferred embodiments.

As shown in FIG. 1, processor system 102 includes the network interface 112 coupled to a smart home network infrastructure 124 which is coupled to social networks 126, smart home visual peripherals 128, and smart home audio peripherals 130 in accordance with preferred embodiments.

In accordance with features of the invention, the processor system 102 together with the smart home network infrastructure 124, the social networks 126, smart home visual peripherals 128, and smart home audio peripherals 130 include image recognition technologies that can identify specific objects in the room, identify individuals, identify facial expressions and body language, and include audio recognition technologies that can identify specific sounds and identify various languages, that can analyze dialogue, and identify people, and network protocol to communicate between devices and external communication networks. When people, places or things are uncovered, social media look-ups are used to determine potential violation.

Referring also to FIG. 2, context analysis entity 114 includes a profile and knowledge base manager 204, an audio and visual monitoring engine 206, and a real time event analysis engine 208 coupled to the system memory 104 including the operating system 108. The profile and knowledge base manager 204 is coupled to the profile database 210 coupled to system memory 104, which stores a home profile 212, a family profile 214, individual profiles 216, room profiles 218, and scenario profiles 220 are created and stored in the profile database. Scenario based profiles 220 are provided where under certain circumstances the triggers and execute actions 118 and notification rules 116 may change. The profile and knowledge base manager 204 is coupled to a historical knowledge base database 222, which is coupled to the system memory 104.

The context analysis entity 114 interfaces with available smart devices such as Alexa, Google Home including social networks 126, and all audio/visual peripherals profile 128, 130. The knowledge base manager 204 manages the profiles and historical knowledge base for the environment. The audio and visual monitoring engine 206 monitors and analyzes the data feeds from the visual and audio collection devices. The audio and visual monitoring engine 206 changes in the feeds. The real time event analysis engine 208 is triggered when something in the feed needs to be examined. The real time event analysis engine 208 performs the notification activity, when needed.

In accordance with features of the invention, the family profile 214 includes a list of family members and pictures of the family members, a list of associates that may have access to the home, for example, the list can be obtained from social media or social networks 126, and a language spoken at home. The family profile 214 includes safety attributes, such as smoking or nonsmoking, selected members of family present, medical issues present, for example, peanut allergies, and the like. Other safety attributes in the family profile 214 include for example, threshold aggregate of volume levels in the home at various time ranges, threshold aggregate of motion levels in the home at various time ranges, and external dynamics indicator which includes selected user indicators, and the like.

In accordance with features of the invention, the individual profile 216 includes for each individual in the home a profile setup including, for example, historical daily routine for access to home, use of vulgar language, baseline of stress level, social media feeds, medical issues, and selected external dynamics indicators. The room profiles 218 includes valuable objects registered, and an access list, such as no kids allowed during set times. The scenario-based profiles 220 include certain circumstances where the triggers and rules may change.

In accordance with features of the invention, the new system 100 of the preferred embodiment provides anomaly detection and notification in the smart home environment through profiled context. Anomalies are detected with the smart home infrastructure 124 by leveraging smart home devices 128, and 130 and social networks 126 in the smart home environment using profiles, such as illustrated and described with respect to FIG. 2. A contextual comparison is generated for differences detected. A feature of the invention is that "soft" or subtle anomalies advantageously are detected, without requiring loud sound triggers. For example, subtle anomalies are detected such as an individual is identified that should not be there, for example, a selected individual identified in one of the profiles.

The system 100 is dynamic such that historical information is updated, and the baseline is updated with changes are analyzed with context against profiles and notification or enforcement is provided if needed.

Figure 3:
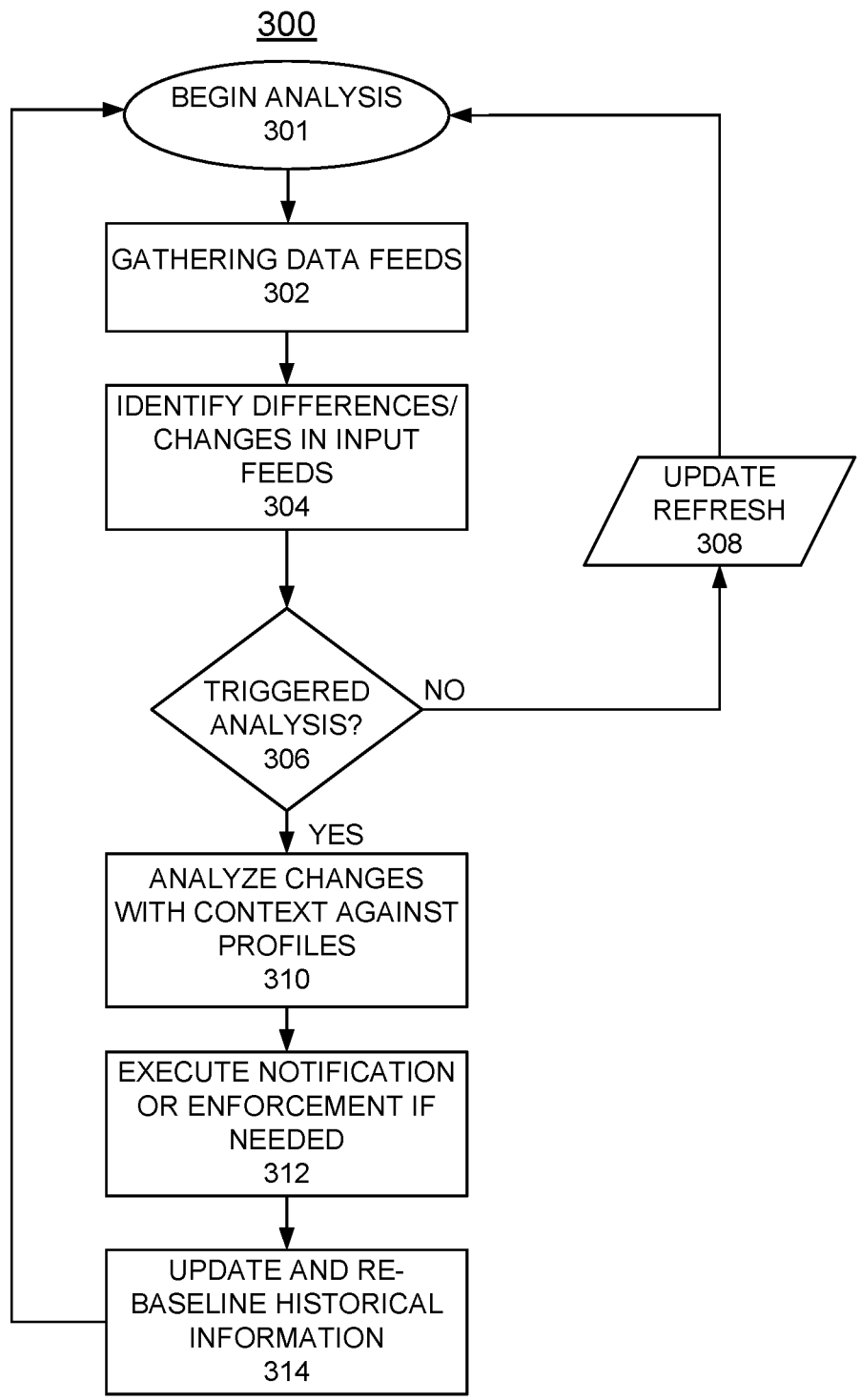
FIGS. 3, and 4 are respective flow charts illustrating example system operations to implement enhanced anomaly detection and notification in a smart home environment through profiled context of FIGS. 1 and 2 in accordance with preferred embodiments.
Figure 4:
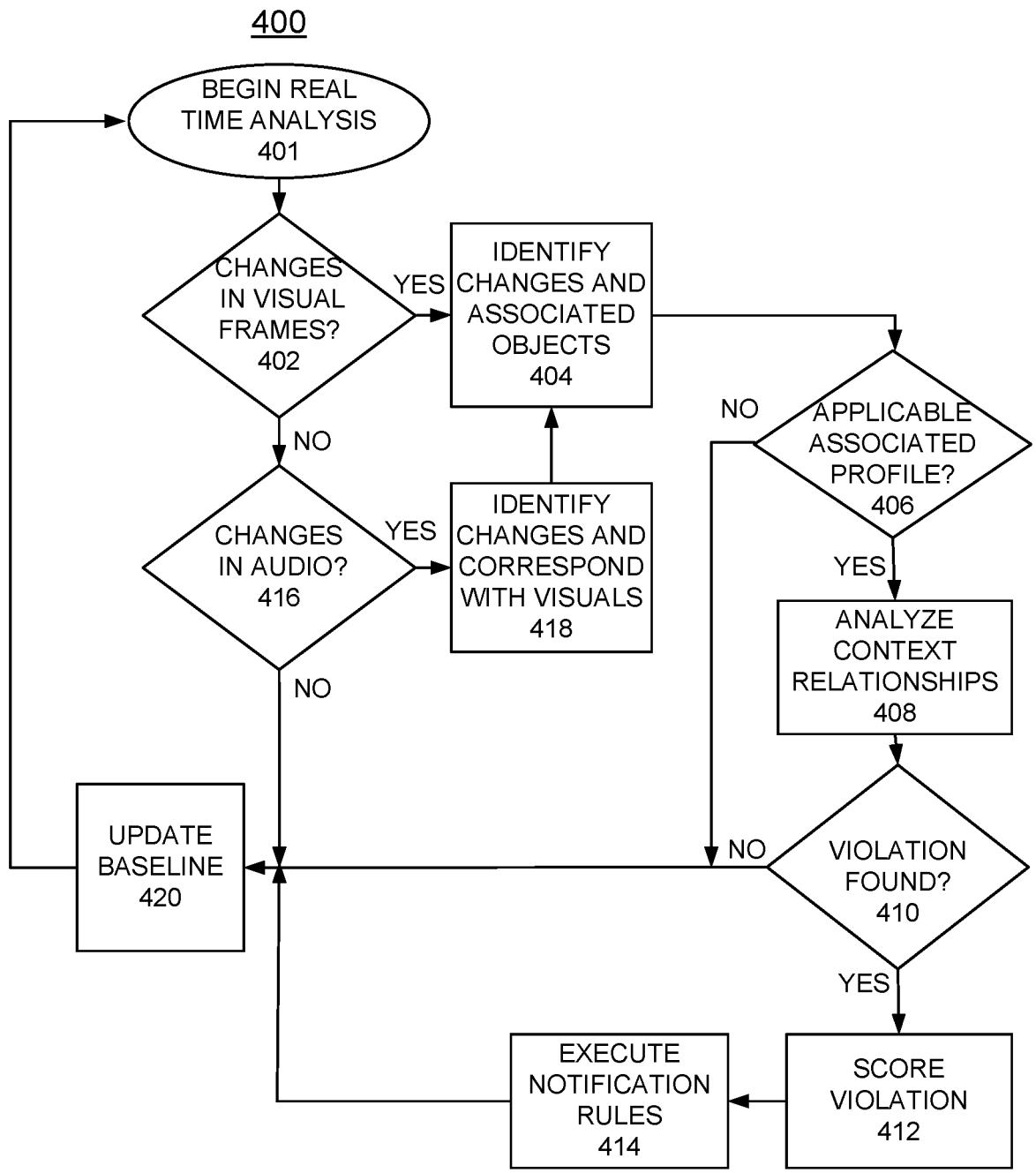

Referring to FIGS. 3, and 4, there are shown example system operations generally designated by the respective reference characters 300, 400 of computer system 100 of FIGS. 1 and 2, for implementing enhanced anomaly detection and notification in smart home environment through profiled context.

Referring to FIG. 3 operations start beginning analysis at a block 301. As indicated at a block 302, data feeds are collected. As indicated in a block 304, differences and changes in input feeds are identified. As indicated in a decision block 306, checking for analysis triggered is performed. As indicated in a block 308, when analysis is not triggered, updating and refreshing is performed. As indicated in a block 310, changes with context are analyzed against profiles. As indicated in a block 312, notification or enforcement is performed if needed. As indicated in a block 314, update and re-baseline of historical information is performed. Then the continuous processing loop continues returning to block 301.

Referring to FIG. 4, there are shown example system operations of computer system 100 of FIGS. 1 and 2, for implementing enhanced intelligent escape route generation with augmented reality in accordance with preferred embodiments starting at a block 401 where real time analysis processing begins. As indicated at a decision block 402, checking for changes in visual frames is performed. As indicated at a block 404, when changes in visual frames are identified, changes and associated objects are identified. As indicated at a decision block 406, checking for an applicable associated profile is performed. As indicated at a block 408, context relationships are analyzed. As indicated at a decision block 410, checking for an identified violation is performed. If a violation is identified, the violation is scored as indicated at a block 412 and notifications rules are performed as indicated at a block 414. When changes in visual frames are not identified at decision block 402, checking for changes in audio is performed as indicated at a decision block 416. When changes in audio are identified, changes and corresponding visuals are identified as indicated at a block 418, and operations continue at block 404. When applicable associated profile is not identified at decision block 406, a violation is not found at decision block 410, and after notifications rules are performed at block 414, the base line is updated as indicated at a block 420 and operations continue at block 401.

Figure 5:
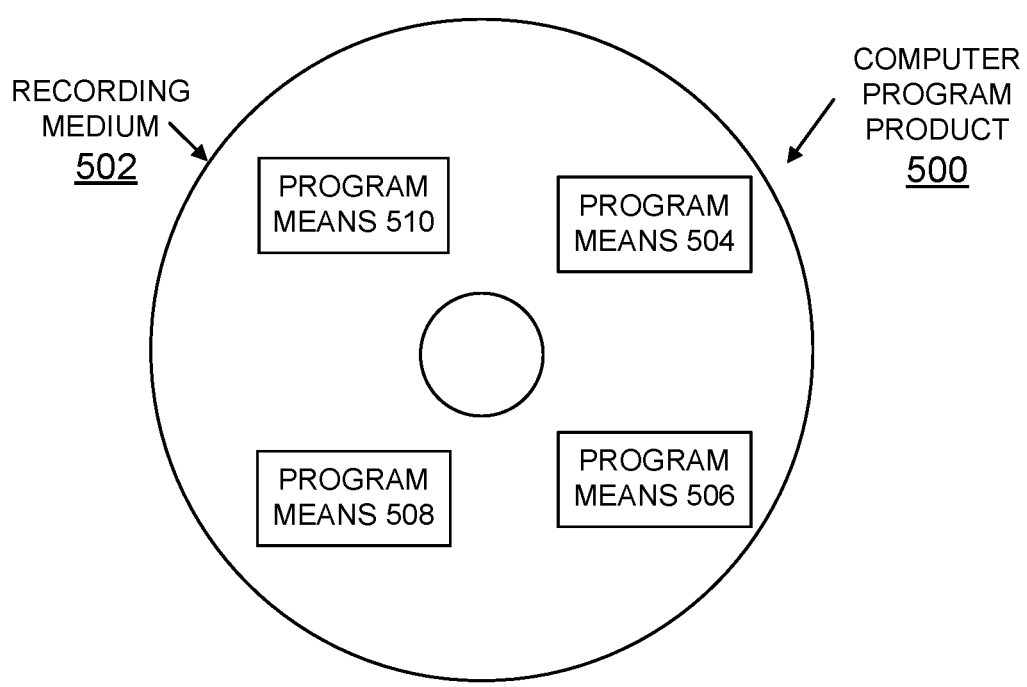
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. The computer readable storage medium 502, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Recording medium 502 stores program means or instructions 504, 506, 508, and 510 on the non-transitory computer readable storage medium 502 for carrying out the methods for implementing enhanced anomaly detection and notification in smart home environment through profiled context in the system 100 of FIGS. 1 and 2.

Computer readable program instructions 504, 506, 508, and 510 described herein can be downloaded to respective computing/processing devices from a computer readable storage medium or to an external computer or external storage device via a network, for example, the Internet, a local area network, a wide area network and/or a wireless network. The computer program product 500 may include cloud-based software residing as a cloud application, commonly referred to by the acronym (SaaS) Software as a Service. The network may comprise copper transmission cables, optical transmission fibers, wireless transmission, routers, firewalls, switches, gateway computers and/or edge servers. A network adapter card or network interface in each computing/processing device receives computer readable program instructions 504, 506, 508, and 510 from the network and forwards the computer readable program instructions for storage in a computer readable storage medium within the respective computing/processing device.

A sequence of program instructions or a logical assembly of one or more interrelated modules defined by the recorded program means 504, 506, 508, and 510, direct the system 100 for implementing enhanced anomaly detection and notification in smart home environment through profiled context of the preferred embodiment.

While the present invention has been described with reference to the details of the embodiments of the invention shown in the drawing, these details are not intended to limit the scope of the invention as claimed in the appended claims.

What is claimed is:

1. A system for implementing enhanced anomaly detection and notification in smart home environment through profiled context comprising:
   a context analysis entity tangibly embodied in a non-transitory machine readable medium used to implement enhanced anomaly detection and notification,
   said context analysis entity, gathering data feeds from smart home devices;
   said context analysis entity, identifying changes in the data feeds to trigger analysis by:
      detecting changes in visual frames;
      in response to detecting changes in visual frames, identifying changes and associated objects;
      in response to not detecting changes in visual frames, detecting changes in audio;
      identifying audio changes and corresponding with visuals when changes in audio are detected;
      identifying changes and associated objects based on the identifying audio changes and corresponding with visuals; and
      checking for an applicable associated profile based on the identified changes and associated objects;
   said context analysis entity, comparing the identified changes within context to an applicable stored profile; and
   said context analysis entity, using the comparisons for automatically taking an appropriate action including performing a notification.

2. The system as recited in claim 1, wherein said context analysis entity includes a profile and knowledge base manager, an audio and visual monitoring engine, and a real time event analysis engine.

3. The system as recited in claim 1, wherein said context analysis entity, gathering data feeds from the smart home devices includes said context analysis entity, establishing a baseline of visual and audio patterns of each room monitored to serve for threshold comparisons.

4. The system as recited in claim 1, wherein said context analysis entity, comparing the identified changes within the context to the applicable stored profile includes said context analysis entity, creating a plurality of profiles, and using predefined profiles to generate a contextual comparison for differences identified.

5. The system as recited in claim 1, includes said context analysis entity, checking for the applicable stored profile, and includes creating a home profile, a family profile, individual profiles, room profiles, and scenario profiles, and storing the created profiles in a profile database.

6. The system as recited in claim 1, includes said context analysis entity, creating and storing a database of a historical knowledge base.

7. The system as recited in claim 1, includes said context analysis entity, creating and storing an entity relationship database.

8. The system as recited in claim 1, wherein said context analysis entity, comparing the identified changes within the context to the applicable stored profile includes identifying a violation, scoring the violation, and performing notification rules.

9. The system as recited in claim 1, wherein said context analysis entity provides context information used for performing a notification to a designated authority being notified.

10. A computer-implemented method for implementing enhanced anomaly detection and notification in smart home environment through profiled context comprising:
   providing a context analysis entity, said context analysis entity tangibly embodied in a non-transitory machine readable medium used to implement enhanced anomaly detection and notification, said context analysis entity:
   gathering data feeds from smart home devices;
   identifying changes in the data feeds to trigger analysis by:
      detecting changes in visual frames;
      in response to detecting changes in visual frames, identifying changes and associated objects;
      in response to not detecting changes in visual frames, detecting changes in audio;
      identifying audio changes and corresponding with visuals when changes in audio are detected;
      identifying changes and associated objects based on the identifying audio changes and corresponding with visuals; and
      checking for an applicable associated profile based on the identified changes and associated objects;
   using predefined profiles to generate a contextual comparison for differences identified; and
   using the comparison for automatically taking an appropriate action including performing a notification.

11. The computer-implemented method as recited in claim 10, includes creating and storing a home profile, a family profile, individual profiles, room profiles, and scenario profiles in a profile database.

12. The computer-implemented method as recited in claim 11, includes establishing attributes for each of the home profile, the family profile, the individual profiles, the room profiles, and the scenario profiles.

13. The computer-implemented method as recited in claim 10, wherein gathering data feeds from the smart home devices includes establishing a baseline of visual and audio patterns of each room monitored to serve for threshold comparison purposes.

14. The computer-implemented method as recited in claim 10, includes creating and storing a home profile, a family profile, individual profiles, room profiles, and scenario profiles in a profile database and checking for the applicable associated profile in the profile database.

15. The computer-implemented method as recited in claim 10, wherein performing notification includes alerting a head of family and a designated authority.

16. The computer-implemented method as recited in claim 15, includes providing context information used for performing the notification to the designated authority.

17. A computer program product comprising one or more non-transitory computer readable storage media, and program instructions collectively stored on the one or more computer readable storage media, the program instructions comprising instructions configured to cause one or more processors to perform a method comprising:
   gathering data feeds from smart home devices;
   identifying changes in the data feeds to trigger analysis by:
      detecting changes in visual frames;
      in response to detecting changes in visual frames, identifying changes and associated objects;
      in response to not detecting changes in visual frames, detecting changes in audio;
      identifying audio changes and corresponding with visuals when changes in audio are detected;
      identifying changes and associated objects based on the identifying audio changes and corresponding with visuals; and
      checking for an applicable associated profile based on the identified changes and associated objects;
   comparing the identified changes within context to an applicable stored profile; and
   using the comparisons for automatically taking an appropriate action including performing a notification.

18. The computer program product recited in claim 17, wherein gathering data feeds from the smart home devices includes establishing a baseline of visual and audio patterns of each room monitored to serve for threshold comparisons.

19. The computer program product recited in claim 17, the method further comprising:
   comparing the identified changes within the context to the applicable stored profile; and
   creating a plurality of profiles, and using predefined profiles to generate a contextual comparison for differences identified.

20. The computer program product recited in claim 17, the method further comprising:
   checking for the applicable stored profile; and
   creating a home profile, a family profile, individual profiles, room profiles, and scenario profiles; and
   storing the created profiles in a profile database.

* * * * *